(12) United States Patent
Xu et al.

(10) Patent No.: US 10,511,476 B2
(45) Date of Patent: Dec. 17, 2019

(54) ABSTRACTING WIRELESS DEVICE TO VIRTUAL ETHERNET INTERFACE

(71) Applicant: Futurewei Technologies, Inc., Plano, TX (US)

(72) Inventors: Jun Xu, Cupertino, CA (US); Ravi Chuppala, Cupertino, CA (US); Rangaraju Iyengar, Morgan Hill, CA (US)

(73) Assignee: Futurewei Technologies, Inc., Plano, TX (US)

( * ) Notice: Subject to any disclaimer, the term of this patent is extended or adjusted under 35 U.S.C. 154(b) by 19 days.

(21) Appl. No.: 15/453,816

(22) Filed: Mar. 8, 2017

(65) Prior Publication Data

US 2018/0262393 A1 Sep. 13, 2018

(51) Int. Cl.
*H04L 12/24* (2006.01)
*H04L 12/46* (2006.01)
(Continued)

(52) U.S. Cl.
CPC ...... *H04L 41/0806* (2013.01); *H04L 12/4641* (2013.01); *H04L 12/64* (2013.01);
(Continued)

(58) Field of Classification Search
CPC ....... H04W 64/00; H04W 88/16; H04W 4/00; H04W 4/025; H04W 72/046;
(Continued)

(56) References Cited

U.S. PATENT DOCUMENTS

| 7,826,364 | B1 * | 11/2010 | Krzanowski | ........ | H04L 12/5602 |
| | | | | | 370/229 |
| 2005/0160180 | A1 * | 7/2005 | Rabje | ...................... | H04L 47/10 |
| | | | | | 709/238 |

(Continued)

FOREIGN PATENT DOCUMENTS

| CN | 101005418 A | 7/2007 |
| CN | 101242370 A | 8/2008 |

(Continued)

OTHER PUBLICATIONS

U.S. Appl. No. 15/439,642, filed Feb. 22, 2017, Method of Application Data Switching Between a Device in a Wireless PAN Mesh Network and a Virtual Ethernet Interface.

(Continued)

*Primary Examiner* — Djenane M Bayard
(74) *Attorney, Agent, or Firm* — Schwegman Lundberg & Woessner, P.A.

(57) ABSTRACT

A wireless interface system includes a wireless network interface, with a virtual Ethernet interface, that is configured to transmit and receive signals over a wireless channel using a predetermined wireless technology protocol. A method for abstracting a wireless interface protocol to an Ethernet protocol includes detecting, with a wireless network interface, access by a wireless device using the wireless interface protocol. A virtual Ethernet interface is created having an associated Ethernet interface ID. The wireless device ID is associated with the Ethernet interface ID in a table in memory. A payload from the wireless device is transmitted over the wireless technology protocol. The payload is transmitted to the virtual Ethernet interface using the Ethernet protocol.

20 Claims, 4 Drawing Sheets

(51) Int. Cl.
*H04L 12/64* (2006.01)
*H04W 72/04* (2009.01)
*H04L 12/931* (2013.01)
*H04L 12/935* (2013.01)

(52) U.S. Cl.
CPC .......... *H04L 49/309* (2013.01); *H04L 49/351* (2013.01); *H04W 72/0453* (2013.01)

(58) Field of Classification Search
CPC ..... H04W 72/048; H04W 4/90; H04W 76/50; H04W 88/06; H04W 48/16; H04W 72/0413; H04W 72/044; H04W 72/08; H04W 72/1205; H04W 74/04; H04W 88/14; H04W 92/20; H04W 24/04; H04W 88/005; H04W 28/04; H04W 4/027; H04W 40/12; H04L 63/20; H04L 12/4641; H04L 63/102; H04L 43/026; H04L 63/166; H04L 63/168; H04L 41/0813; H04L 41/082; H04L 63/0227; H04L 67/16
See application file for complete search history.

(56) References Cited

U.S. PATENT DOCUMENTS

| | | | |
|---|---|---|---|
| 2007/0076648 | A1 | 4/2007 | Yong |
| 2008/0056261 | A1 | 3/2008 | Osborn et al. |
| 2009/0245278 | A1 | 10/2009 | Kee |
| 2010/0214949 | A1* | 8/2010 | Smith .................. H04L 45/586 370/254 |
| 2012/0099579 | A1 | 4/2012 | Kim et al. |
| 2013/0003530 | A1 | 1/2013 | Davari |
| 2014/0226659 | A1 | 8/2014 | Tsirkin |
| 2014/0269263 | A1* | 9/2014 | Zeng .................... H04W 24/04 370/228 |
| 2014/0313418 | A1 | 10/2014 | Woo |
| 2014/0328296 | A1 | 11/2014 | Chen et al. |
| 2015/0010003 | A1 | 1/2015 | Song et al. |
| 2015/0381531 | A1 | 12/2015 | Huang |
| 2016/0021684 | A1 | 1/2016 | Lewis et al. |
| 2016/0119251 | A1* | 4/2016 | Solis .................. H04L 43/0876 709/224 |
| 2016/0315687 | A1* | 10/2016 | Jeanne ................. H04W 88/16 |
| 2017/0237626 | A1* | 8/2017 | Nair .................... H04L 12/4641 370/255 |
| 2018/0242099 | A1 | 8/2018 | Chuppala et al. |

FOREIGN PATENT DOCUMENTS

| | | |
|---|---|---|
| CN | 102611634 A | 7/2012 |
| CN | 103490961 A | 1/2014 |
| CN | 104821925 A | 8/2015 |
| CN | 106209932 A | 12/2016 |

OTHER PUBLICATIONS

"U.S. Appl. No. 15/439,642, Non-Final Office Action dated Jun. 5, 2018", 12 pgs.

"Internatonal Application Serial No. PCT/CN2018/078361, International Search Report dated May 16, 2018", 4 pgs.
"Internatonal Application Serial No. PCT/CN2018/078361, Written Opinion dated May 16, 2018", 4 pgs.
Wang, Reen-Cheng, et al., "Internetworking Between ZigBee/802.15.4 and IPv6/802.3 Network", SIGCOMM 2007 Workshop "IPv6 and the Future of the Internet" (IPv6'07), Aug. 31, 2008, Kyoto, Japan, (2007), 6 pgs.
"Bluetooth", [online]. [archived on Dec. 27, 2016]. Retrieved from the Internet: <URL: https://wiki.archlinux.org/index.php/bluetooth>, (Dec. 15, 2016), 8 pgs.
"Cel MeshConnecttm User Guide", 0018-08-08-00-000 HA1.2.1 ZigBee-to-Ethernet Gateway Demo User Guide, (Jul. 15, 2015), 1-10.
"Getting Started with ZigBee® Reference Designs", [online]. [retrieved on Jan. 4, 2017]. Retrieved from the Internet: <URL: http://www.silabs.com/products/wireless/Pages/zigbee-reference-design-getting-started.aspx>, (2017), 5 pgs.
"IEEE Standard for Local and metropolitan area networks—Part 15.4: Low-Rate Wireless Personal Area Networks (LR-WPANs)", IEEE Std 802.15.4tm-2011 (Revision of IEEE Std 802.15.4-2006, (Sep. 5, 2011), 314 pgs.
"Introducing the Official XBee Java Library", [online]. © 1996-2017 Digi International Inc. [retrieved on Jun. 9, 2017]. [Retrieved from the Internet: <URL: https://www.digi.com/blog/community/official-xbee-Java-library/>, (2017), 3 pgs.
"Introducing the Official XBee Java Library—Machine Talk Blog", [online]. © Copyright 1996-2017 Digi International Inc. [retrieved on Jan. 4, 2017]. Retrieved from the Internet: <URL: http://www.digi.com/blog/community/official-xbee-java-library/>, (2017), 2 pgs.
"ZigBee Specification", Copyright © 2007 ZigBee Standards Organization. Document 053474r17, (2007), 604 pgs.
"Zigbee Wireless Networking Systems", {online]. © 2017 Silicon Laboratories. [retrieved on Jun. 9, 2017]. Retrieved from the Internet: <URL: http://www.silabs.com/products/wireless/mesh-networking/zigbee>, 8 pgs.
Janc, Szymon, "Bluetooth on modern Linux", Embedded Linux Conference, San Diego, 2016, [online]. Retrieved from the Internet: <URL: http://events.linuxfoundation.org/sites/events/files/slides/Bluetooth%20on%20Modern%20Linux_0.pdf>, (2016), 28 pgs.
"U.S. Appl. No. 15/439,642, Final Office Action dated Oct. 11, 2018", 13 pgs.
"U.S. Appl. No. 15/439,642, Response filed Aug. 20, 2018 to Non Final Office Action dated Jun. 5, 2018", 10 pgs.
"International Application Serial No. PCT/CN2018/076789, International Search Report dated May 18, 2018", 4 pgs.
"International Application Serial No. PCT/CN2018/076789, Written Opinion dated May 18, 2018", 4 pgs.
Kim, K., et al., "Interoperability of 6LoWPAN draft-daniel-6lowpan-interoperability-01.txt", Network Working Group, Internet-Draft, (Jul. 9, 2005), 10 pgs.
"U.S. Appl. No. 15/439,642, Non Final Office Action dated Mar. 28, 2019", 13 pgs.
"U.S. Appl. No. 15/439,642, Response filed Dec. 18, 2018 to Final Office Action dated Oct. 11, 2018", 13 pgs.
"European Application No. 18758076.6, Extended European Search Report dated Oct. 9, 2019", (Oct. 9, 2019), 9 pgs.

* cited by examiner

ABSTRACTING WIRELESS DEVICE TO VIRTUAL ETHERNET INTERFACE

CROSS-REFERENCE TO RELATED APPLICATIONS

This application is related to co-pending, commonly assigned, U.S. patent application Ser. No. 15/439,642, entitled "METHOD OF APPLICATION DATA SWITCHING BETWEEN A DEVICE IN A WIRELESS PAN MESH NETWORK AND A VIRTUAL ETHERNET INTERFACE," filed on Feb. 22, 2017, which is hereby incorporated by reference in its entirety.

FIELD OF THE INVENTION

The present disclosure is related to low power, low bandwidth wireless devices, and in particular to abstracting the wireless device to a virtual Ethernet interface.

BACKGROUND

Most low bandwidth wireless interfaces and devices (e.g., ZigBee®, Bluetooth®, Z-wave®) have different respective protocols and specifications for operation. When developing applications for these interfaces and devices, it is common that the interfaces transport packets via a kernel driver along with its stack to a software development kit (SDK) in the user space along with the applications. Thus, each application needs to be aware of the pairing, joining, and data packet protocols for each different type of interface. This may be a burden on software developers to include all of the different interface protocols into their applications for operation with different interfaces from different vendors.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

Example 1 is a computer-implemented method for abstracting a wireless interface protocol to an Ethernet protocol in a controller, the method comprising: detecting, with a wireless network interface of the controller, access by a wireless device using the wireless interface protocol, the wireless device identified by a wireless device identification (ID); creating a virtual Ethernet interface having an associated Ethernet interface ID; associating the wireless device ID with the Ethernet interface ID in a table in memory of the controller; receiving a payload from the wireless device over the wireless technology protocol; and transmitting the payload to the virtual Ethernet interface using the Ethernet protocol.

In Example 2, the subject matter of Example 1 optionally includes the wireless network interface performing a lookup of the table for the associated Ethernet interface ID associated with the wireless device ID prior to transmitting the payload to the virtual Ethernet interface having the associated Ethernet interface ID.

In Example 3, the subject matter of any one or more of Examples 1-2 optionally include applications of an application layer receiving the payload from a raw socket of the virtual Ethernet interface.

In Example 4, the subject matter of any one or more of Examples 1-3 optionally include wherein transmitting the payload to the application layer comprises storing the payload in shared memory between the virtual Ethernet interface and an associated application plugin in the application layer.

In Example 5, the subject matter of any one or more of Examples 1-4, wherein the payload is a first payload and optionally including transmitting a second payload from an application plugin to the virtual Ethernet interface; forwarding the second payload from the virtual Ethernet interface to the wireless network interface using the Ethernet protocol; performing a lookup of the table to determine the wireless device ID associated with the virtual Ethernet interface ID; and transmitting the first payload to the wireless device comprising the wireless device ID using the wireless interface protocol.

Example 6 is a wireless interface system comprising: a wireless network interface configured to transmit and receive signals over a wireless channel using a predetermined wireless technology protocol and interface between the predetermined wireless technology protocol and Ethernet protocol; a non-transitory memory comprising instructions; and one or more processors in communication with the wireless network interface and the memory, wherein the one or more processors execute the instructions to detect, with the wireless network interface, access by a wireless device using the predetermined wireless technology protocol, the wireless device identified by a wireless device identification (ID); create a virtual Ethernet interface having an associated Ethernet interface ID; associate the wireless device ID with the Ethernet interface ID in a table in the memory; receive a payload from the wireless device over the wireless technology protocol; and transmit the payload to the virtual Ethernet interface using the Ethernet protocol.

In Example 7, the subject matter of Example 6 optionally includes predetermined wireless technology protocol that conforms to one of IEEE 802.15.4, IEEE 802.15.1, or Z-Wave® protocol.

In Example 8, the subject matter of any one or more of Examples 6-7 optionally include wherein the wireless network interface comprises radios, antennas, drivers, protocol stacks for the predetermined wireless technology protocol.

In Example 9, the subject matter of any one or more of Examples 6-8 optionally include wherein the one or more processors execute the instructions to create a lookup table in the memory comprising a wireless device ID and an associated virtual Ethernet ID and access the lookup table during communication between the wireless device and the virtual Ethernet interface.

In Example 10, the subject matter of any one or more of Examples 6-9 optionally include wherein the wireless network interface further comprises a radio and antenna for communicating with the wireless device using the predetermined wireless technology protocol.

In Example 11, the subject matter of any one or more of Examples 6-10 optionally include wherein the one or more processors execute the instructions to separate a data path and control path from the wireless device in a user space of the controller and present the data path to an operating system as the virtual Ethernet interface.

In Example 12, the subject matter of any one or more of Examples 6-11 optionally include wherein the one or more processors execute the instructions to perform control path functions between the controller and the wireless device and pass data payloads to the virtual Ethernet interface.

In Example 13, the subject matter of any one or more of Examples 6-12 optionally include shared memory coupled between the virtual Ethernet interface and an application layer.

In Example 14, the subject matter of any one or more of Examples 6-13 optionally include wherein the virtual Ethernet interface and the shared memory are in a kernel of an operating system of the controller.

Example 15 is a non-transitory computer-readable media storing computer instructions for abstracting a wireless interface technology protocol to Ethernet protocol in a wireless interfaced system, that when executed by one or more processors, cause the one or more processors to perform the steps of: detect, with a wireless network interface, access by a wireless device using the wireless interface protocol, the wireless device identified by a wireless device identification (ID); create a virtual Ethernet interface having an Ethernet interface ID; associate the wireless device ID with the Ethernet interface ID in a table in memory; receive a payload from the wireless device over the wireless technology protocol; and transmit the payload to the virtual Ethernet interface using the Ethernet protocol.

In Example 16, the subject matter of Example 15 optionally includes wherein the one or more processors further separate a control path and a data path of the wireless device.

In Example 17, the subject matter of Example 16 optionally includes wherein the one or more processors further perform the control path in the wireless network interface and the data path in a user space of the wireless interface system.

In Example 18, the subject matter of any one or more of Examples 15-17 optionally include wherein the one or more processors further create the virtual Ethernet interface in a kernel of an operating system of the wireless interface system.

In Example 19, the subject matter of any one or more of Examples 15-18 optionally include wherein the one or more processors further pair the wireless device, with the wireless network interface, to a network that uses the wireless interface protocol.

In Example 20, the subject matter of Example 19 optionally includes wherein the one or more processors further assign the wireless device ID to the wireless device, with the wireless network interface, when pairing the wireless device to the network.

Any one of the foregoing examples may be combined with any one or more of the other foregoing examples to create a new embodiment within the scope of the present disclosure.

DETAILED DESCRIPTION

Figure 1:
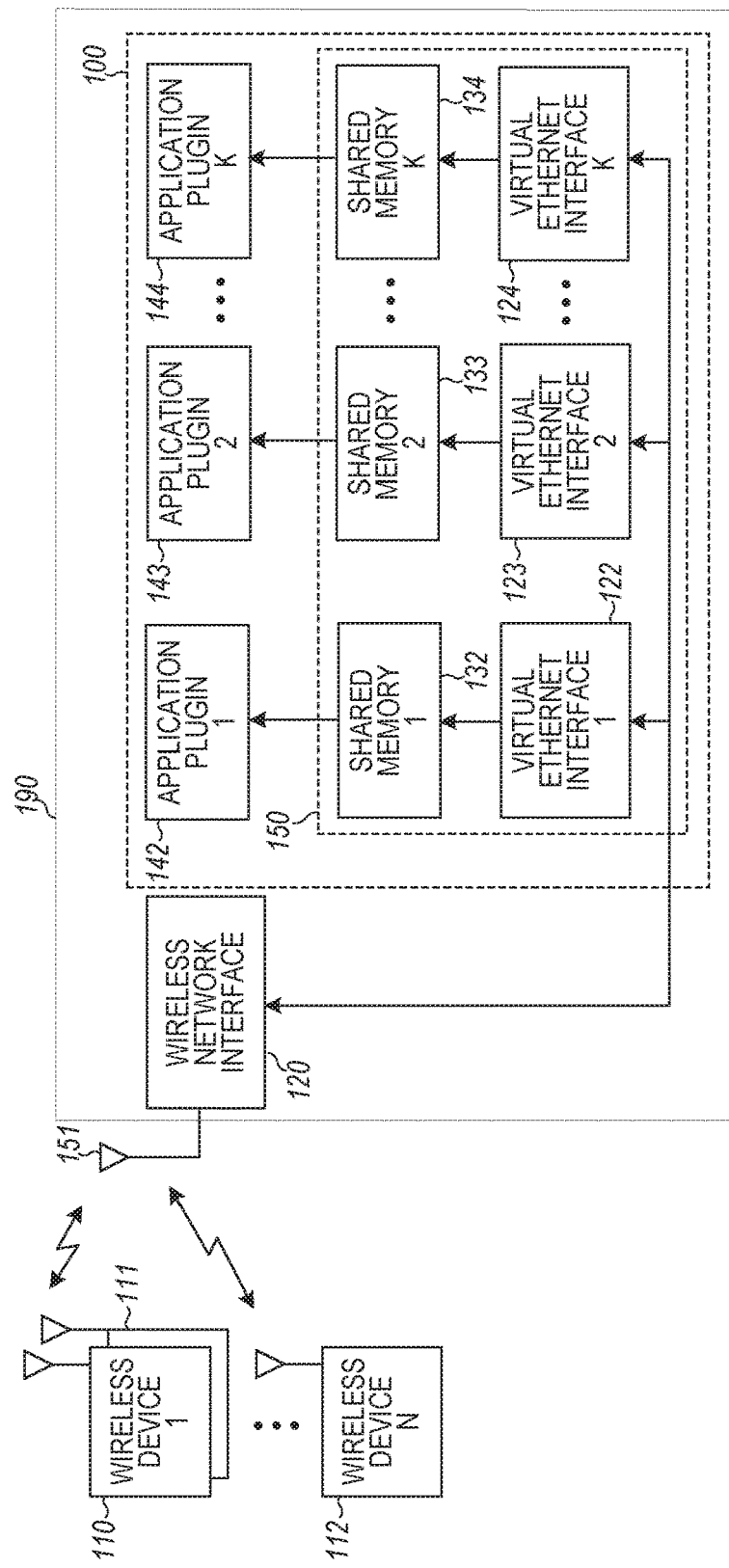
FIG. 1 is a block diagram of a communication system, according to various embodiments.

The ZigBee®, Bluetooth®, and Z-Wave® relatively short-range wireless interface technologies are used for remote monitoring and control. These technologies are typically used for home-area networks (HANs) or personal area networks (PANs) and are becoming more widespread. However, the protocols and specifications for each of these technologies are different. Thus, application developers need to generate a different application to communicate and operate with each respective technology. This may result in greater expense for the developers due to increased development costs.

The method for abstracting the devices using various wireless protocol technologies to virtual Ethernet interfaces provides the application developers with the ability to generate applications free from potential vendor specific issues. The applications may be developed independent of the interface technology, device vendor, or device type. As used herein, abstracting the wireless devices refers to mapping the wireless devices to virtual Ethernet interfaces.

Subsequent reference to the ZigBee® (i.e., Institute of Electrical and Electronics Engineers (IEEE) 802.15.4), Z-Wave®, or Bluetooth® (IEEE 802.15.1) standards is only for purposes of illustrating operation of the method for abstracting a wireless device to a virtual Ethernet interface. Other relatively low power and low bandwidth wireless standards may also be implemented in various embodiments of the method. For example, the wireless interface may have data rates in a range of 20 kilobits per second (kb/s) in the 868 Megahertz (MHz) band to 250 kb/s in the 2.4 Gigahertz band, a transmission power range in a range of 1 to 100 milliwatts (mW), and a communication range of 10-50 meters.

The method described subsequently separates the control path and the data path of the wireless interfaces. The logic for handling network packets can be broadly divided into two categories: a control path and a data path. Control path packets are destined to or locally originated by the router itself. The control path functions include the system configuration, management, and exchange of control information. Data path packets go through the network device and transit traffic. The data path enables data transfer to and from clients. Data path traffic travels through network device. The data path is separated (e.g., in the user space) and is presented to the operating system (OS) as a generic Ethernet interface. The application layer may then handle the data packets from the payload using traditional OS Ethernet handling.

As used herein, user space may be defined as a portion of system memory in which user processes (e.g., applications) execute. This contrasts with kernel space which is that portion of system memory in which the kernel executes and provides its services. The kernel may be defined as a computer program that constitutes the central core of a computer's OS. The kernel has control over processes that occur in the OS. The kernel is the first program loaded on startup so that it may then manage the remainder of the startup as well as input/output requests from executing applications by translating the requests into data processing instructions for the central processing unit (CPU). The kernel may also be responsible for managing memory and communicating with computer peripherals.

FIG. 1 is a block diagram of a communication system, according to various embodiments. As shown in FIG. 1, the system includes wireless device 1 110, wireless device 2 111, and wireless device N 112 that communicate over a wireless channel with a wireless interface system 190 (e.g., computer, server, tablet computer, smartphone, electronic device). The wireless interface system 190 is a controller that includes a wireless network interface 120 coupled to memory 100. The wireless device 1 110, the wireless device 2 111, and the wireless device N 112 may be referred to in the aggregate as the wireless devices 110-112.

Figure 4:
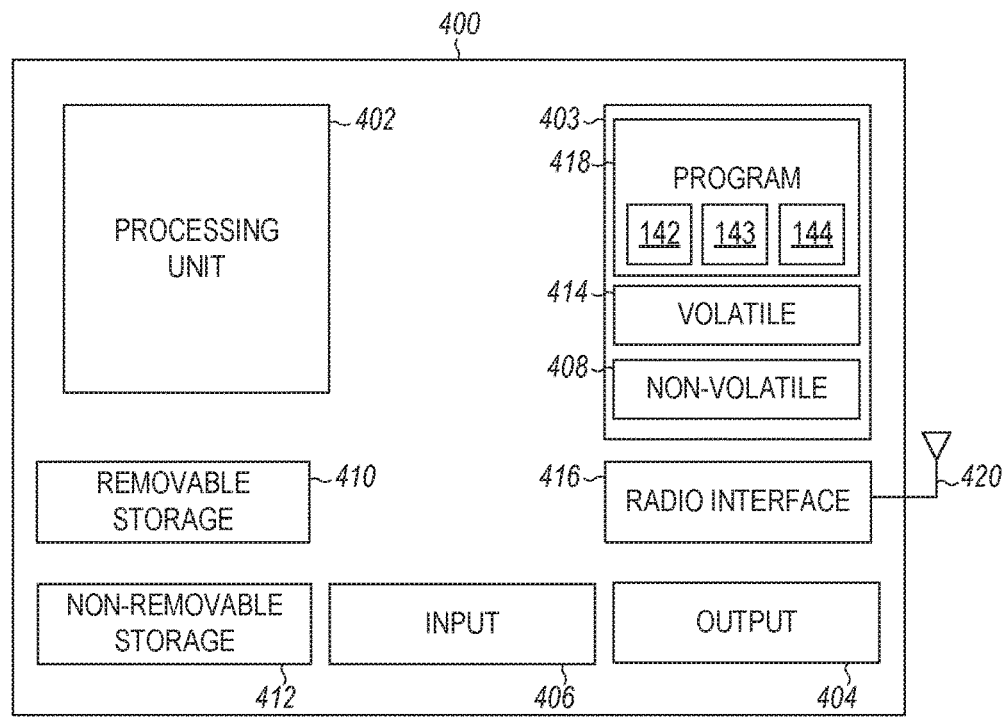
FIG. 4 is a block diagram illustrating circuitry for wireless devices, wireless network interface, and servers for implementing algorithms and performing methods, according to various embodiments.

Each of the wireless devices 110-112 may be a ZigBee®, Z-Wave®, or Bluetooth® device such as an element of a home security network (e.g., door/window sensor, motion sensor), an element of a home controller network (e.g., remote controlled light switch, remote controlled power outlet), or an element of some other mesh or low power network. The wireless devices 110-112 each have a radio and antenna for communicating over the wireless channel with the wireless network interface 120. Each of the wireless devices 110-112 also includes a processing unit for controlling the respective device within the bounds of the device's respective wireless interface protocol. FIG. 4 illustrates one such example of an implementation of a wireless device (e.g., the wireless device 110, 111, or 112).

The wireless interface system 190 includes the wireless network interface 120 coupled to the memory 100. The memory 100 includes application plugin 1 142, application plugin 2 143, and application plugin K 144 as well as OS kernel 150. The application plugin 1 142, the application plugin 2 143, and the application plugin K 144 may be referred to collectively as application plugins 142-144. The OS kernel 150 includes a virtual Ethernet interface 1 122, a virtual Ethernet interface 2 123, a virtual Ethernet interface K 124, a shared memory 1 132, a shared memory 2 133, and a shared memory K 134, where K is equal to N. The virtual Ethernet interface 1 122, the virtual Ethernet interface 2 123, and the virtual Ethernet interface K 124 may be referred to collectively as virtual Ethernet interfaces 122-124. The shared memory 1 132, the shared memory 2 133, and the shared memory K 134 may be referred to collectively as shared memories 132-134.

The wireless network interface 120 includes the radios, antennas 151, drivers, protocol stacks, and programming to communicate with the wireless devices 110-112 using a respective one of the wireless interface technologies via a wireless network. For example, the wireless network interface 120 may be an interface to Z-Wave® wireless devices, ZigBee® wireless devices, or Bluetooth® wireless devices. The wireless network interface 120 provides the control path functions, as discussed previously, while passing the data path functions on to a virtual Ethernet interface (e.g., the virtual Ethernet interface 122) corresponding to the wireless device being communicated with (e.g., the wireless device 110). In some example embodiments, the virtual Ethernet interface corresponding to the wireless device is created at the time of the wireless device joining the network. In an embodiment, the wireless network interface 120 includes a processing unit, comprising one or more processors, for executing instructions in memory as well as memory. FIG. 4 shows one possible implementation of the wireless network interface 120.

The virtual Ethernet interfaces 122-124, in an embodiment, may be created in the OS kernel 150 of memory 100. In other words, each of the wireless devices 110-112 may be assigned a respective virtual Ethernet interface 122, 123, or 124. As discussed subsequently, which virtual Ethernet interface 122, 123, or 124 is generated and associated with a particular wireless device 110, 111, or 112 is tracked by the wireless network interface 120.

For example, assuming the wireless device 1 110 and the wireless device 2 111 are both Z-Wave® devices, the wireless network interface 120 may create and associate the virtual Ethernet interface 1 122 with the wireless device 1 110 and create and associate the virtual Ethernet interface 2 123 with the wireless device 2 111. Further assuming the wireless device N 112 is a ZigBee® device, the wireless network interface 120 may create and associate the virtual Ethernet interface K 124 with the wireless device N 112.

Each of the virtual Ethernet interfaces 122-124 may be coupled to a respective shared memory 132, 133, or 134. The shared memory 132-134 may be in the OS kernel 150 of memory 100. The OS may be any computer operating system such as Linux, Windows, or Macintosh OS.

Each of the shared memories 132-134 may be shared with a respective coupled application plugin 142, 143, or 144. Thus, application plugin 1 142 may share shared memory 1 132 with virtual Ethernet interface 1 122, application plugin 2 143 may share shared memory 2 133 with virtual Ethernet interface 2 123, and application plugin K 144 may share shared memory K 134 with virtual Ethernet interface K 124.

The control path, providing functions to manage devices and networks, may be a hardware path or a virtual path as presently disclosed. Similarly, a data path, providing functions to retrieve and generate data payloads, may be a hardware path or a virtual path as presently disclosed. The application plugins 142-144 are part of the application layer of the OS. Since the control path for each wireless device is handled by the wireless network interface 120, the data path from each of the wireless devices 110-112 is handled by its respective application plugin 142, 143, or 144. Thus the application plugins 142-144 do not have to be dedicated to any one particular wireless interface technology. Each of the application plugins 142-144 communicates using its respective virtual Ethernet interface 122, 123, or 124. Thus, application developers may write one application plugin that may communicate with its associated wireless device over any one of the wireless interface technologies and using generic Ethernet protocols.

Figure 2:
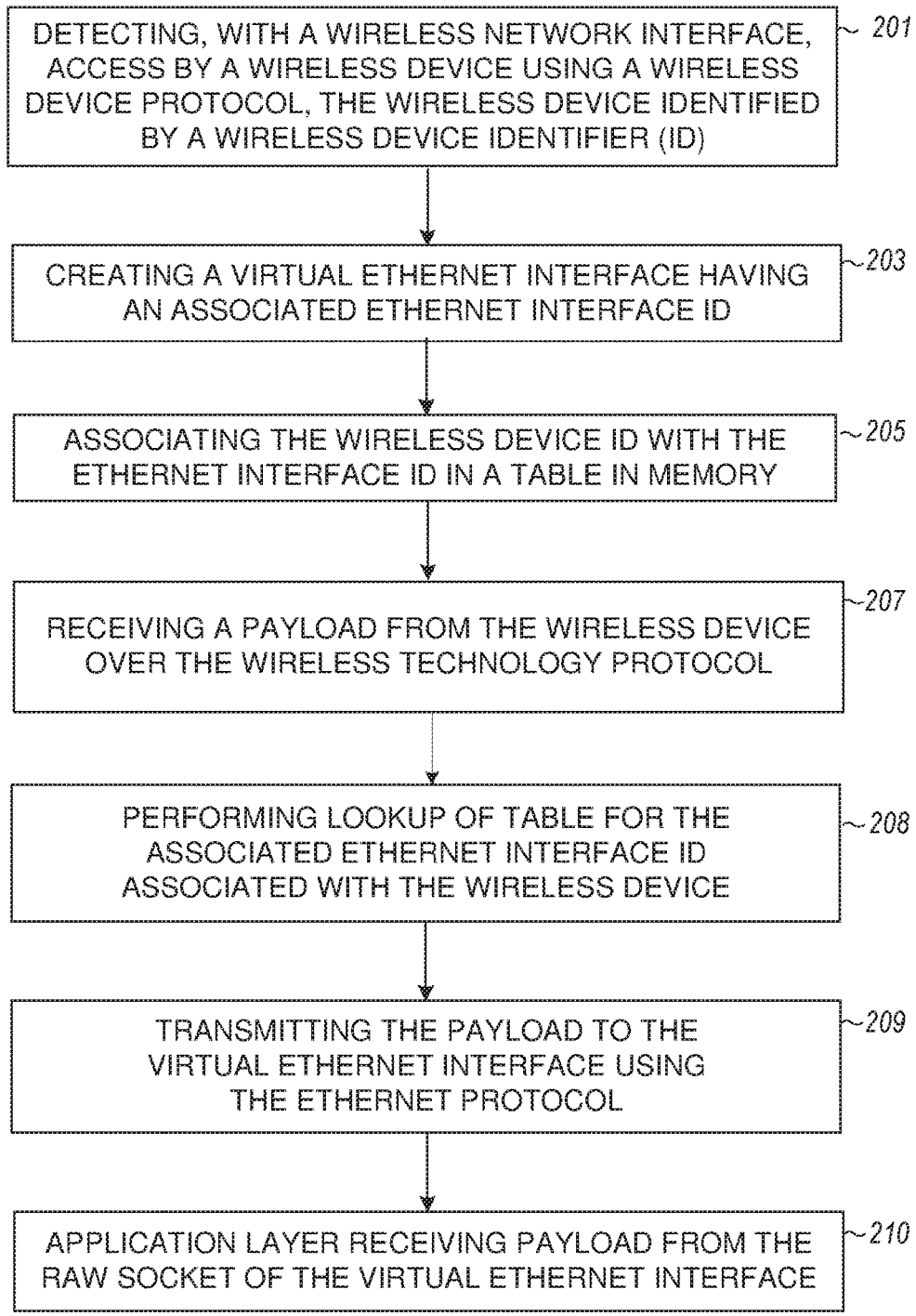
FIG. 2 is a flowchart of an embodiment of a method for abstracting a wireless device to a virtual Ethernet interface.

FIG. 2 is a flowchart of an embodiment of a method for abstracting each of the wireless devices 110-112 to a respective virtual Ethernet interface 122-124. This method maps one or more of the wireless devices 110-112, attempting to join a wireless network with the wireless interface system 190, to its own respective Ethernet interface 122-124.

Block 201 includes detecting, with the wireless network interface 120, access by a wireless device (e.g., the wireless device 110) using a wireless interface protocol wherein the wireless device is identified by a wireless device identifier (ID). For example, the system access by the wireless device may be a pairing routine by the wireless device with the wireless network interface 120 in order to set up or join a mesh network (e.g., personal area network) as described subsequently with reference to FIG. 5.

Block 203 includes when the access (e.g., pairing request) is detected, creating a virtual Ethernet interface having an associated Ethernet interface ID. Each of the requesting wireless devices 110-112 is assigned a different associated virtual Ethernet interface. The wireless network interface 120 may perform the task of assigning the device ID and associating that device ID with a particular virtual Ethernet interface ID. The wireless network interface 120 may then create a lookup table in memory (e.g., the memory 403 of FIG. 4) for wireless device IDs and associated virtual Ethernet interface IDs. The wireless device ID is communicated to the corresponding wireless device (e.g., the wireless device 110, 111, or 112) for storing.

Block 205 includes the wireless network interface 120 associating the wireless device ID with the Ethernet interface ID in the table in memory (e.g., the memory 403 of FIG. 4). Thus the table may include a plurality of wireless device IDs each with a respective associated Ethernet interface ID for the associated virtual Ethernet interface.

Block 207 includes receiving a data payload from one of the wireless devices 110, 111, or 112 over a wireless network using the wireless technology protocol. The payload may be received in the form of a transmitted packet from one of the wireless devices 110, 111, or 112. The data payload is initially attached to the wireless device ID to identify the packet and is separated from the packet by the wireless network interface 120.

Block 208 includes the wireless network interface 120 performing a lookup of the table for the associated Ethernet interface ID associated with the wireless device ID. The wireless network interface 120, in block 207, may perform the lookup of the virtual Ethernet interface ID that was assigned to that particular wireless device ID.

Block 209 includes the wireless network interface 120 transmitting the payload to the virtual Ethernet interface using the Ethernet protocol. The data payload may be sent to the Ethernet interface in an Ethernet frame. The Ethernet frame structure is well known in the art and not discussed further.

Block 210 includes the application layer (e.g., the application plugins 142-144 of FIG. 1) receiving the payload from a raw socket (i.e., an Internet socket that allows direct sending and receiving of Internet Protocol packets without any protocol-specific transport layer formatting) of the associated virtual Ethernet interface. For example, the virtual Ethernet interface 1 122 may store the payload in the shared memory 1 132 for access by the application plugin 1 142. Thus, the payload received by the wireless network interface 120 is provided to the application layer by a virtual Ethernet interface (e.g., the virtual Ethernet interface 1 122).

Figure 3:
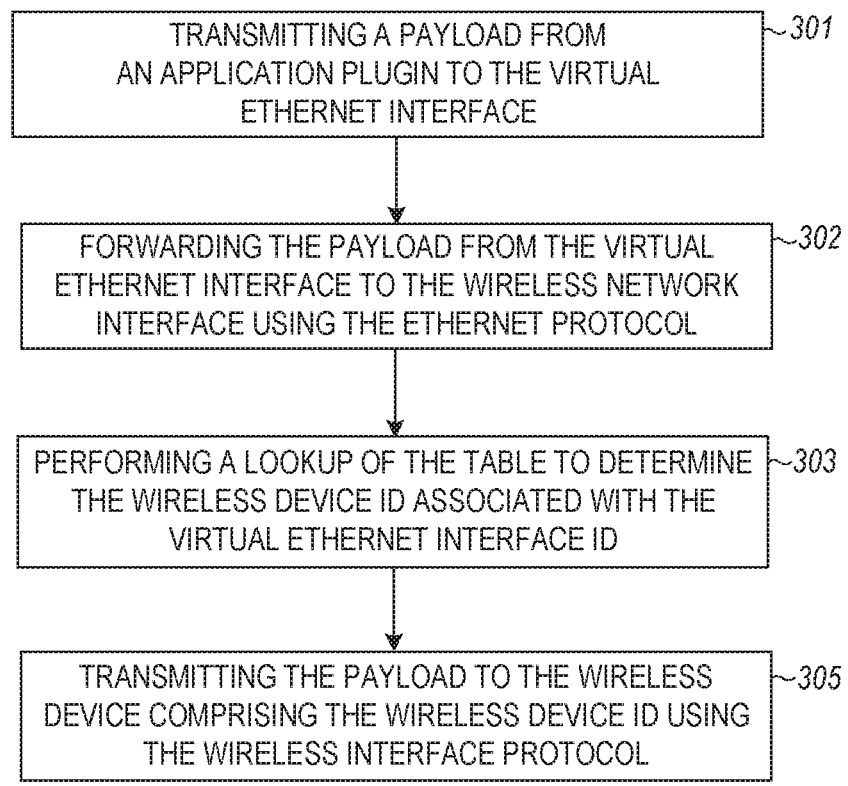
FIG. 3 is a flowchart of another embodiment of the method for abstracting the wireless interface to the virtual Ethernet interface.

FIG. 3 is a flowchart of another embodiment of the method for abstracting a wireless interface to a virtual Ethernet interface. The method of FIG. 3 assumes that the wireless devices 110-112 have each already been assigned a respective unique wireless device ID (e.g., node ID) for the network, a respective virtual Ethernet interface 122, 123, or 124 has been created, and its Ethernet interface ID associated with the respective node ID, as provided in the method of FIG. 2.

Block 301 includes the application layer (e.g., the application plugins 142-144 of FIG. 1) transmitting a payload from an application plugin to its respective virtual Ethernet interface 122, 123, or 124 associated with the application plugin. This may be accomplished by the application plugin storing the data in the shared memory 132, 133, or 134 that is associated with both the application plugin 142, 143, or 144 and its respective virtual Ethernet interface 122, 123, or 124.

Block 302 includes the virtual Ethernet interface forwarding the second payload from the virtual Ethernet interface to the wireless network interface 120 using the Ethernet protocol (e.g., as part of a payload in an Ethernet frame). The virtual Ethernet interface ID is associated with the frame.

Block 303 includes the wireless network interface 120 performing a lookup of the table to determine the wireless device ID associated with the virtual Ethernet interface ID that transmitted the frame. This step determines the wireless interface technology and, thus, the transmission protocol used by the desired wireless device 110, 111, or 112.

Block 305 includes the wireless network interface 120 transmitting the payload to the wireless device comprising the wireless device ID using the wireless interface protocol. Thus, the wireless network interface 120 reformats the data payload using the protocol and specifications for that particular wireless device 110, 111, or 112. The wireless network interface 120 then transmits the data payload as a radio frequency signal over the wireless channel to the desired wireless device 110, 111, or 112.

FIG. 4 is a block diagram illustrating circuitry for wireless devices, wireless network interface, and servers for implementing algorithms and performing methods, according to various embodiments. The elements of the block diagram are for purposes of illustration only as some components need not be used in various embodiments.

One example computing device 400 implemented as the wireless interface system 190 (e.g., controller) may include a processing unit 402 (e.g., CPU), memory 403, removable storage 410, and non-removable storage 412. The processing unit 402 may include one or more processors.

The processors 402 may create the associated virtual Ethernet interfaces 122-124, execute the necessary wireless technology protocol and Ethernet protocol to interface between the wireless devices 110-112 and the Ethernet interfaces 122-124, create lookup tables in memory comprising the wireless device ID and associated virtual Ethernet ID, as well as perform a lookup of this table during communication between the wireless devices 110-112 and the virtual Ethernet interfaces 122-124. The memory 403 may include instructions for executing the predetermined wireless technology protocol.

Although the example computing device is illustrated and described as a computer 400, the computing device may be in different forms in different embodiments. Further, although the various data storage elements 410, 412 are illustrated as part of the computer 400, the storage may also or alternatively include cloud-based storage accessible via a network, such as the Internet or server based storage.

The memory 403 may include volatile memory 414 and non-volatile memory 408. The computer 400 may include—or have access to a computing environment that includes—a variety of computer-readable media, such as volatile memory 414 and non-volatile memory 408, removable storage 410 and non-removable storage 412. The program memory 408 stores executable instructions for execution by the processing unit 402 and may be part of the volatile memory 414, the non-volatile memory 408, the removable storage 410, or the non-removable storage 412. For example, the application plugins 142-144 may be stored in the program memory 418, for execution by the processing unit 402 in the application layer. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The computer 400 may include or have access to a computing environment that includes input 406, output 404, and a radio interface 416 with associated antenna 420. The output 404 may include a display device, such as a touchscreen, that also may serve as an input device. The input 406 may include one or more of a touchscreen, touchpad, mouse, keyboard, camera, one or more device-specific buttons, one or more sensors integrated within or coupled via wired or wireless data connections to the computer 400 and other input devices. The computer 400 may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks. The radio interface 416 may transmit and receive RF signals over a wireless channel using any modulation scheme or protocol using any specification.

Computer-readable instructions stored on a computer-readable medium are executable by the processing unit 402 of the computer 400. A hard drive, CD-ROM, and RAM are some examples of articles including a non-transitory computer-readable medium such as a storage device. The terms computer-readable medium and storage device do not include carrier waves to the extent carrier waves are deemed too transitory. Storage may also include networked storage such as a storage area network (SAN) indicated at 420.

Figure 5:
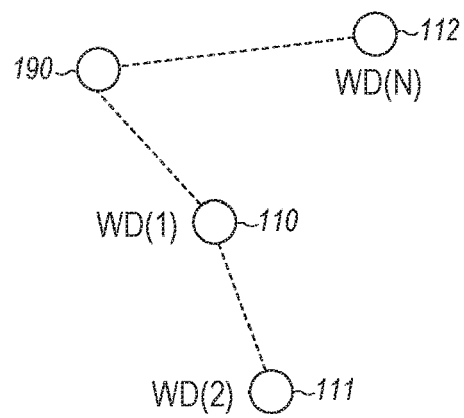
FIG. 5 is a diagram of a network incorporating one or more wireless devices to be abstracted to the virtual Ethernet interface, according to various embodiments.

FIG. 5 is a diagram of a wireless network incorporating one or more wireless devices to be abstracted to the virtual Ethernet interface, according to various embodiments. As an example of operation of a wireless device 110, 111, or 112 in the wireless network, a Z-wave® embodiment is illustrated. However, it should be realized that this is for purposes of illustration only as the method for abstracting a wireless interface to a virtual Ethernet interface may be used with any wireless protocol.

The network of FIG. 5 includes the wireless interface system 190 and the plurality of wireless devices 110-112 as illustrated in FIG. 1 and discussed previously. Z-Wave® uses a source-routed mesh network architecture. A message from the wireless interface system 190 to wireless device 2 111 may be successfully delivered even if the wireless interface system 190 and the wireless device 2 111 are not within range, providing that another wireless device 110 is able to communicate with both the wireless interface system 190 and wireless device 2 111. If the preferred route is unavailable, the message originator will attempt other routes until a path from the wireless interface system 190 is found to wireless device 2 111. Therefore, a Z-Wave® network may span much farther than the radio range of a single unit; however, with several of these hops a slight delay may be introduced between the control command and the desired result.

The simplest network is a single controllable device 110 and the wireless interface system 190. Additional wireless devices may be added at any time, as may secondary controllers, including traditional hand-held controllers, keyfob controllers, wall-switch controllers and PC applications designed for management and control of the Z-Wave® network.

In order for a wireless device to be "included" to the Z-Wave® network, a process known as "pairing" or "adding" is performed. The pairing process is usually achieved by pressing a sequence of buttons on a keypad/input of the wireless interface system 190 and on the wireless device 110, 111, or 112 being added to the network. This sequence needs to be performed once, after which the wireless device 110, 111, or 112 is always recognized as a network node by the wireless interface system 190. Devices may be removed from the Z-Wave® network by a similar process. The wireless interface system 190 learns the signal strength between the devices during the inclusion process, thus the architecture expects the devices to be in their intended final location before they are added to the system.

The pairing process is performed between the wireless device 110, 111, or 112 and the wireless network interface 120 in the wireless interface system 190, as seen in FIG. 1. The remainder of the wireless interface system 190 does not care what wireless technology is used since the OS kernel simply receives the data path from the pairing and paired wireless devices 110-112 over an Ethernet protocol.

Each Z-Wave network is identified by a network ID and each wireless device is further identified by a node ID. The network ID, also referred to as the home ID, is the common identification of all nodes belonging to one logical Z-Wave® network. The network ID may have a length of four bytes (32 bits) and is assigned to each wireless device 110, 111, or 112 by the wireless network interface 120 when the device is "included" into the network. Network nodes with different network IDs cannot communicate with each other. The node ID is the address of a single node (i.e., wireless device 110, 111, or 112) in the network. The node ID has a length of one byte (8 bits) and is unique in its network to the particular wireless device 110, 111, or 112 to which it is assigned.

In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

By comparison with prior art methods and systems, the methods and systems of abstracting a wireless device to a virtual Ethernet interface disclosed herein may simplify the process of developing software to interact with one or more wireless devices. Additionally, by virtue of separating the control path processing from the data path processing, software and hardware performing the control path processing can be shared between multiple application plugins. As a result, memory, CPU usage, or both may be reduced.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for abstracting a wireless interface protocol to an Ethernet protocol in a controller, the method comprising:
    detecting, with a wireless network interface of the controller, access by a wireless device using the wireless interface protocol, the wireless device identified by a wireless device identification (ID);
    creating a virtual Ethernet interface for the wireless device within an operating system kernel of the controller, the virtual Ethernet interface having an Ethernet interface ID and being coupled via a shared memory to an application plugin within an application layer of the controller;
    associating the wireless device ID with the Ethernet interface ID in a table in memory of the controller;
    receiving, by the wireless network interface of the controller, a payload from the wireless device over the wireless interface protocol; and
    transmitting, by the wireless network interface of the controller, the payload to the virtual Ethernet interface using the Ethernet protocol.

2. The method of claim 1, further comprising the wireless network interface performing a lookup of the table for the Ethernet interface ID associated with the wireless device ID prior to transmitting the payload to the virtual Ethernet interface having the Ethernet interface ID.

3. The method of claim 1, further comprising:
    receiving, by the application plugin of the application layer of the controller, the payload from a raw socket of the virtual Ethernet interface.

4. The method of claim 3, further comprising:
    transmitting the payload from the virtual Ethernet interface to the application plugin by storing the payload in the shared memory between the virtual Ethernet interface and the application plugin.

5. The method of claim 1, wherein:
    the payload is a first payload; and
    the method further comprises:
        transmitting a second payload from the application plugin to the virtual Ethernet interface;
        forwarding the second payload from the virtual Ethernet interface to the wireless network interface using the Ethernet protocol;
        performing a lookup of the table to determine the wireless device ID associated with the Ethernet interface ID; and
        transmitting the second payload to the wireless device comprising the wireless device ID using the wireless interface protocol.

6. A wireless interface system comprising:
    a wireless network interface configured to transmit and receive signals over a wireless channel using a predetermined wireless interface protocol, and interface between the predetermined wireless interface protocol and an Ethernet protocol;
    a non-transitory memory comprising instructions; and
    one or more processors in communication with the wireless network interface and the memory, wherein the one or more processors execute the instructions to:
        detect, with the wireless network interface, access by a wireless device using the predetermined wireless interface protocol, the wireless device identified by a wireless device identification (ID);
        create a virtual Ethernet interface for the wireless device within an operating system kernel of the wireless interface system, the virtual Ethernet interface having an Ethernet interface ID and being coupled via a shared memory to an application plugin within an application layer of the wireless interface system;
        associate the wireless device ID with the Ethernet interface ID in a table in the memory;
        receive a payload from the wireless device over the predetermined wireless interface protocol; and
        transmit the payload to the virtual Ethernet interface using the Ethernet protocol.

7. The wireless interface system of claim 6, wherein the predetermined wireless interface protocol conforms to one of IEEE 802.15.4, IEEE 802.15.1, or Z-Wave® protocol.

8. The wireless interface system of claim 6, wherein the wireless network interface comprises radios, antennas, drivers, and protocol stacks for the predetermined wireless interface protocol.

9. The wireless interface system of claim 6, wherein the one or more processors execute the instructions to:
    create the table in the memory, the table comprising the wireless device ID and an associated virtual Ethernet ID; and
    access the table during communication between the wireless device and the virtual Ethernet interface.

10. The wireless interface system of claim 9, wherein the wireless network interface further comprises a radio and an antenna for communicating with the wireless device using the predetermined wireless interface protocol.

11. The wireless interface system of claim 10, wherein the one or more processors execute the instructions to separate a data path and a control path from the wireless device in a user space of the wireless interface system and present the data path to an operating system as the virtual Ethernet interface.

12. The wireless interface system of claim 11, wherein the one or more processors execute the instructions to perform control path functions between the wireless interface system and the wireless device and pass data payloads to the virtual Ethernet interface.

13. The wireless interface system of claim 6, wherein the one or more processors execute the instructions to:
    transmit a second payload from the application plugin to the virtual Ethernet interface;
    forward the second payload from the virtual Ethernet interface to the wireless network interface using the Ethernet protocol;
    perform a lookup of the table to determine the wireless device ID associated with the Ethernet interface ID; and
    transmit the second payload to the wireless device comprising the wireless device ID using the predetermined wireless interface protocol.

14. The wireless interface system of claim 6, wherein the virtual Ethernet interface and the shared memory are in a kernel of an operating system of the wireless interface system.

15. A non-transitory computer-readable media storing computer instructions for abstracting a wireless interface protocol to an Ethernet protocol in a controller, that when executed by one or more processors, cause the one or more processors to perform the steps of:

detect, with a wireless network interface of the controller, access by a wireless device using the wireless interface protocol, the wireless device identified by a wireless device identification (ID);

create a virtual Ethernet interface for the wireless device within an operating system kernel of the controller, the virtual Ethernet interface having an Ethernet interface ID and being coupled via a shared memory to an application plugin within an application layer of the controller;

associate the wireless device ID with the Ethernet interface ID in a table in memory;

receive, by the wireless network interface of the controller, a payload from the wireless device over the wireless interface protocol; and transmit, by the wireless network interface of the controller, the payload to the virtual Ethernet interface using the Ethernet protocol.

16. The non-transitory computer-readable media of claim 15, wherein the one or more processors further separate a control path and a data path of the wireless device.

17. The non-transitory computer-readable media of claim 16, wherein the one or more processors further perform the control path in the wireless network interface and the data path in a user space of the controller.

18. The non-transitory computer-readable media of claim 16, wherein the control path is one of a virtual control path or a hardware control path.

19. The non-transitory computer-readable media of claim 15, wherein the one or more processors further pair the wireless device, with the wireless network interface, to a network that uses the wireless interface protocol.

20. The non-transitory computer-readable media of claim 19, wherein the one or more processors further assign the wireless device ID to the wireless device, with the wireless network interface, when pairing the wireless device to the network.

* * * * *